United States Patent
DeHart et al.

(10) Patent No.: US 8,823,204 B2
(45) Date of Patent: Sep. 2, 2014

(54) VEHICLE ELECTRIC LOAD SYSTEM

(75) Inventors: Paul DeHart, Urbana, OH (US); Takahide Mizuno, Dublin, OH (US); Hirokazu Toyoshima, Dublin, OH (US); Masanori Ohara, Tochigiken (JP); Joji Hijikata, Tochigiken (JP); Kazuhiko Imamura, Tochigiken (JP); Kotaro Miyashita, Tochigiken (JP)

(73) Assignee: Honda Motor Co., Ltd., Tokyo (JP)

( * ) Notice: Subject to any disclaimer, the term of this patent is extended or adjusted under 35 U.S.C. 154(b) by 711 days.

(21) Appl. No.: 13/036,771

(22) Filed: Feb. 28, 2011

(65) Prior Publication Data

US 2012/0217798 A1     Aug. 30, 2012

(51) Int. Cl.
*B60R 16/02*     (2006.01)
*B60L 1/00*     (2006.01)
*B60R 16/03*     (2006.01)
*H02J 1/14*     (2006.01)

(52) U.S. Cl.
CPC ............... *B60L 1/003* (2013.01); *B60R 16/03* (2013.01); *B60R 16/02* (2013.01); *Y02T 90/16* (2013.01); *H02J 1/14* (2013.01)
USPC ......................................................... 307/9.1

(58) Field of Classification Search
CPC ................................. B60R 16/02; B60R 16/03
USPC .................................................. 307/9.1, 10.1
See application file for complete search history.

(56) References Cited

U.S. PATENT DOCUMENTS

| | | | |
|---|---|---|---|
| 4,426,968 A | | 1/1984 | Onuki et al. |
| 4,682,097 A | * | 7/1987 | Matsui .......................... 320/123 |
| 4,697,562 A | * | 10/1987 | Boccadoro et al. ....... 123/339.16 |
| 4,766,862 A | | 8/1988 | Hibino et al. |
| 4,930,460 A | * | 6/1990 | Aihara et al. ............... 123/41.49 |
| 5,057,764 A | * | 10/1991 | Fujimoto et al. ................. 322/14 |
| 5,561,243 A | * | 10/1996 | Machida ..................... 73/114.39 |
| 5,718,200 A | * | 2/1998 | Chujo et al. ............. 123/339.16 |
| 5,738,049 A | * | 4/1998 | Ninomiya ................... 123/41.15 |
| 5,808,367 A | | 9/1998 | Akagi et al. |
| 5,831,411 A | * | 11/1998 | Klauer et al. ............... 290/40 R |
| 5,908,019 A | | 6/1999 | Fukuchi et al. |
| 5,975,049 A | * | 11/1999 | Kawasaki ................ 123/339.12 |
| 5,986,439 A | * | 11/1999 | Pletta et al. ...................... 322/59 |
| 6,009,852 A | * | 1/2000 | Akabori et al. .......... 123/339.19 |
| 6,082,329 A | | 7/2000 | Kazumasa |
| 6,173,696 B1 | | 1/2001 | Fett et al. |

(Continued)

FOREIGN PATENT DOCUMENTS

| | | |
|---|---|---|
| JP | 60-022038 | 2/1985 |
| JP | 60-022039 | 2/1985 |
| JP | 22-33845 | 9/1990 |

*Primary Examiner* — Adi Amrany
(74) *Attorney, Agent, or Firm* — Rankin, Hill & Clark LLP

(57) ABSTRACT

An electric load system and method for a vehicle includes an electric load, electric devices, an electrically driven element operating in an operating state, an electric load detector to measure an electric load generated by the electric devices, and an electric control unit communicating with the electric load detector and the electrically driven element to determine an electric load of the electric load system. The method includes estimating an electric load of the electrically driven element based on an operating state of the electrically driven element via the electric control unit and adding the electric load from the electrically driven element to an electric load measured by the electric load detector.

16 Claims, 3 Drawing Sheets

(56) References Cited

U.S. PATENT DOCUMENTS

| | | |
|---|---|---|
| 6,443,105 B2 * | 9/2002 | Oishi .......................... 123/41.12 |
| 6,758,172 B2 * | 7/2004 | Morgan et al. ............. 123/41.08 |
| 6,895,928 B2 | 5/2005 | Shepperson |
| 6,910,458 B2 * | 6/2005 | Oki ............................ 123/198 F |
| 7,082,923 B2 | 8/2006 | Yui et al. |
| 7,256,513 B2 * | 8/2007 | Kumar et al. .................. 307/9.1 |
| 7,466,108 B2 * | 12/2008 | Suzuki et al. .................... 322/37 |
| 7,886,669 B2 * | 2/2011 | Kumar ....................... 105/26.05 |
| 2002/0116925 A1 * | 8/2002 | Hampson et al. ............ 60/605.1 |
| 2007/0164713 A1 * | 7/2007 | Suzuki et al. ..................... 322/28 |

\* cited by examiner

VEHICLE ELECTRIC LOAD SYSTEM

BACKGROUND

The present disclosure relates to an electric system in an automotive vehicle and more specifically, to an electric load system and method of determining electric loads and adjusting a power output of an engine to compensate for the electric loads.

Electric loads in an automotive vehicle are electrically powered by several power sources such as, a battery, an alternator, or an engine. Activating an electric load creates an output drain on the associated power source. To ensure that the output of the power source remains suitable for its intended use, the power source must be compensated.

To determine how much compensation is required to the affected power source, the electric load (EL) is measured either directly by an electric control unit (ECU) or by an electric load detector (ELD). For example, the electric load generated by an electric power steering unit may be measured directly by the electric control unit (ECU). On the other hand, the electric load generated by electric devices (ED), such as lights, radio, windshield wipers, etc., in the vehicle's electric system may be measured by the electric load detector (ELD). The electric load detector (ELD) measures the electric load from the electric devices ELED and sends this information to the electric control unit (ECU). The electric control unit (ECU) calculates the total electric load ELTOTAL by adding the electric load measured directly by the ECU and the electric load measured by the electric load detector (ELD).

With the addition of more and more electric devices in modern vehicles, however, the electric load measured by the electric load detector (ELD) increases. As the electric load increases a larger and more expensive electric load detector (ELD) is required to measure the increase in the electric load. This in turn increases manufacturing and production costs.

SUMMARY

In accordance with one aspect, an electric load system for a vehicle is provided that overcomes the above mentioned disadvantages. The electric load system includes a plurality of electric devices, an electrically driven element operating in an operating state, an electric load detector to measure an electric load generated by the plurality of electric devices, and an electric control unit communicating with the electric load detector and the electrically driven element. The electric control unit estimates an electric load generated by the electrically driven element based on the operating state of the electrically driven element. Further, the electric control unit adds the electric load generated by the electric load measured by the electric load detector and the estimated electric load generated by the electrically driven element to determine a total electric load.

In accordance with another aspect, an electric load system for a vehicle includes a plurality of electric devices, a radiator fan configured to operate in a plurality of voltage modes, an electric load detector to measure an electric load generated by the plurality of electric devices, and an electric control unit communicating with the electric load detector and the radiator fan, where the electric control unit estimates an electric load generated by the radiator fan based on the voltage mode configuration of the radiator fan, and where the electric control unit adds the electric load generated by the electric load measured by the electric load detector and the electric load generated by the radiator fan to determine a total electric load.

In accordance with yet another aspect, a method of determining an electric load in a vehicle that includes measuring an electric load from an electric load detector, operating an electrically driven element in an operating state, estimating an electric load generated by the electrically driven element based on the operating state of the electrically driven element, and adding the electric load generated by the electric load from the electric load detector, and the electric load generated by the electrically driven element to determine a total electric load, where the electric load generated by the electrically driven element is determined by an electric control unit.

DETAILED DESCRIPTION

As mentioned above, electric loads in an automotive vehicle are electrically powered by several power sources such as, a battery, an alternator, or an engine. Activating an electric load creates an output drain on the associated power source. To ensure that the output of the associated power source remains suitable for its intended use, the associated power source must be compensated.

For example, if the activated electric load is powered by the battery, the battery experiences a decrease in output. Thus, the alternator, which electrically charges the battery, must increase its output to the battery to compensate the battery for the additional electric load. In turn, the engine must increase its output to the alternator to compensate the alternator for compensating the battery. Similarly, if the activated electric load is powered by the alternator, the engine must increase its output to the alternator to compensate the alternator for the additional electric load. Finally, if the activated electric load is powered by the engine, the engine must increase its output to compensate for the additional electric load.

Thus, in order to ultimately compensate the affected power source, an idling speed of the engine must be increased since the alternator and ultimately, the battery receive power from the engine. For example, if the activated electric load is powered by the alternator, the idling speed of the engine will increase to supply adequate power to the alternator to insure that the output from the alternator is suitable to properly charge the battery and to power the activated electric load and existing electric loads.

Figure 2:
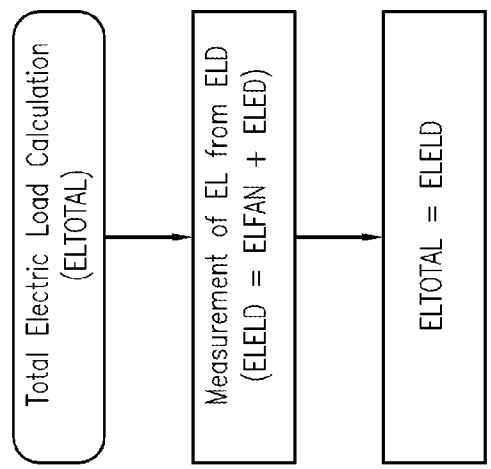
FIG. 2 is a flowchart illustrating the calculation of the total electric load in the known electric load system of FIG. 1.
Figure 1:
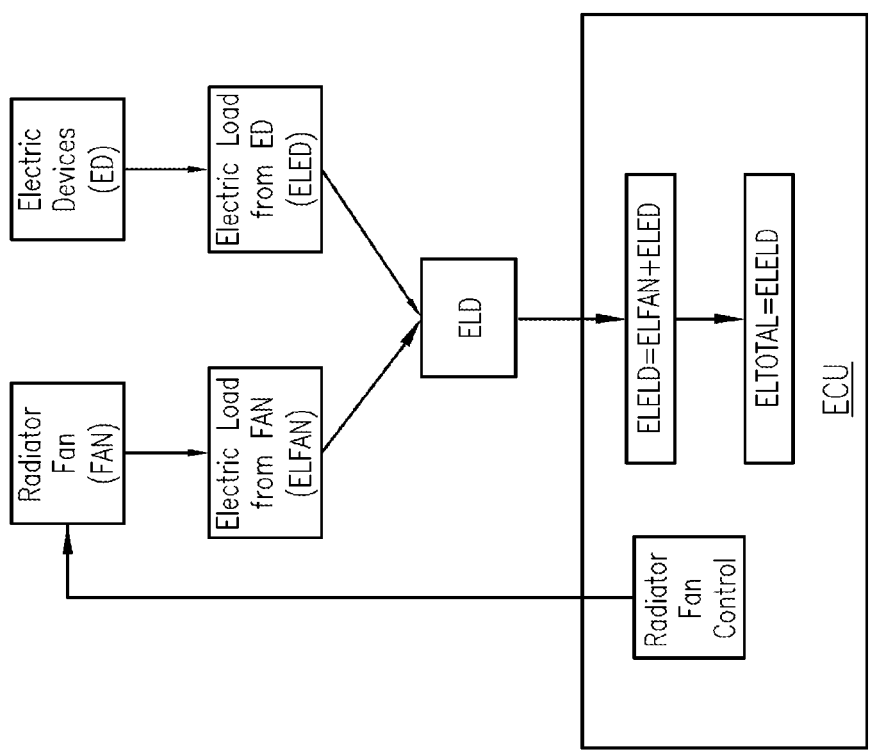
FIG. 1 is a schematic block diagram illustrating a known electric load system.

In a known system, with reference to FIGS. 1 and 2, an electric load ELED from multiple electric devices (ED) and an electric load ELFAN generated by a radiator fan (FAN) are measured by an electric load detector (ELD). The electric load detector (ELD) may be located near a fuse box in the vehicle's engine compartment and measures a total current through the fuse box. Thus, the electric load measured by the electric load detector ELELD is equal to the electric load from the electric devices ELED plus the electric load from the radiator fan ELFAN. In other words, ELELD=ELED+ELFAN. This information is sent to an electric control unit (ECU), where the ECU can compensate the affected power source. In this arrangement, the (ELD) must be sufficiently large, which tends to be more expensive.

Figure 3:
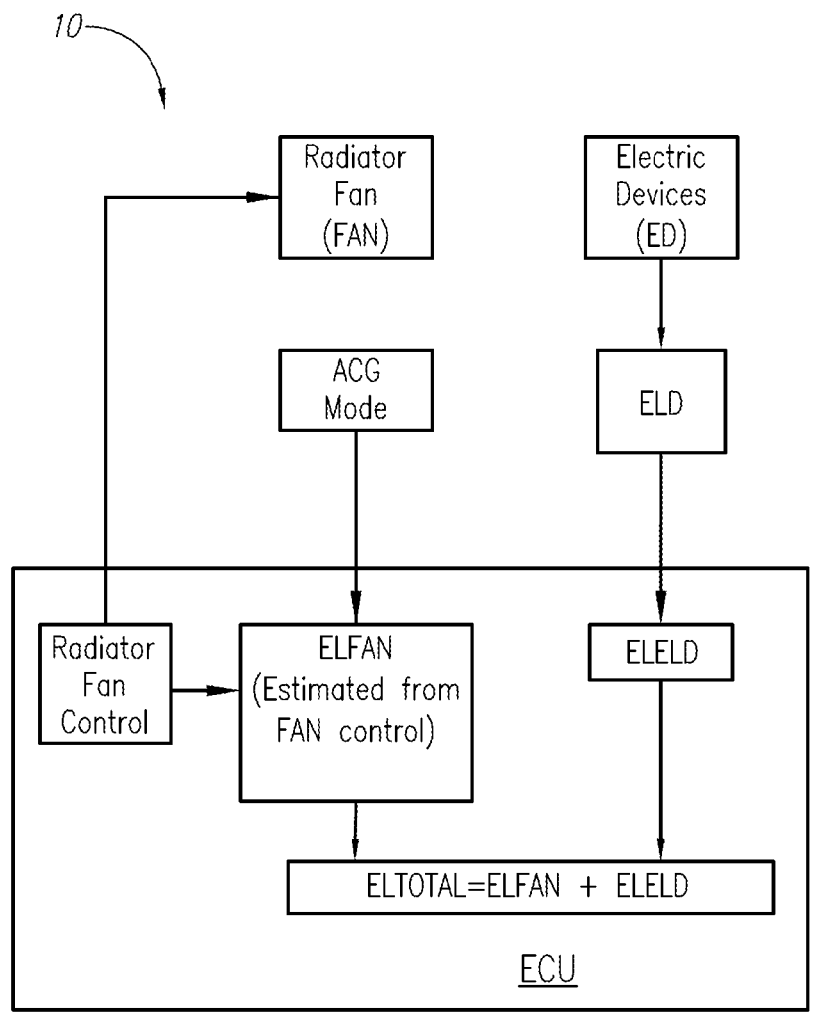
FIG. 3 is a schematic block diagram illustrating an electric load system in accordance with the present invention.

Referring now to FIG. 3, a schematic block diagram illustrates the arrangement of an electric load system 10 for an automotive vehicle that overcomes the above mentioned disadvantages. The electric load system 10 includes an electric load detector (ELD), which measures an electric load of nearly all main electric devices (ED), such as lights, radio, windshield wipers, etc. An electric load generated by a radiator fan (FAN), however, is determined by an electric control unit (ECU). Whereas, as mentioned above in reference to FIG. 1, typically the electric load generated by the radiator fan (FAN) is measured by the electronic load detector (ELD). This arrangement is possible because the electric control unit (ECU) controls the ON/OFF state and the fan speed of the radiator fan (FAN). Thus, the electric control unit (ECU) can determine the electric load of the radiator fan (FAN) based on the ON/OFF state and the fan speed.

Specifically, with reference to FIG. 3, the electric load from the electric devices (ED) measured by the electric control unit (ELD) is denoted as ELELD. This information is communicated to the electronic control unit (ECU) for further calculation. The electric load generated by the radiator fan (FAN) is determined by the electric control unit (ECU) and is denoted as ELFAN. The electric load from the radiator fan ELFAN is estimated by the electric control unit (ECU). The electric load from the radiator fan ELFAN is a function of the operating state of the radiator fan (FAN). For example, the radiator fan (FAN) may operate at a high speed (H) or at a low speed (L). Further, the radiator fan (FAN) can optionally operate at multiple voltage levels. For example, an alternating current generator (ACG) may have a first or low voltage mode (e.g. 12v) and a second or high voltage mode (e.g. 14v). Accordingly, the electric load generated by the radiator fan ELFAN may have multiple values based on the alternating current generator (ACG) mode and the operating state of the radiator fan (FAN). Thus, the total electric load in the electric load system is denoted as ELTOTAL and is the sum of ELELD and ELFAN. Thus, ELTOTAL=ELELD+ELFAN.

Figure 4:
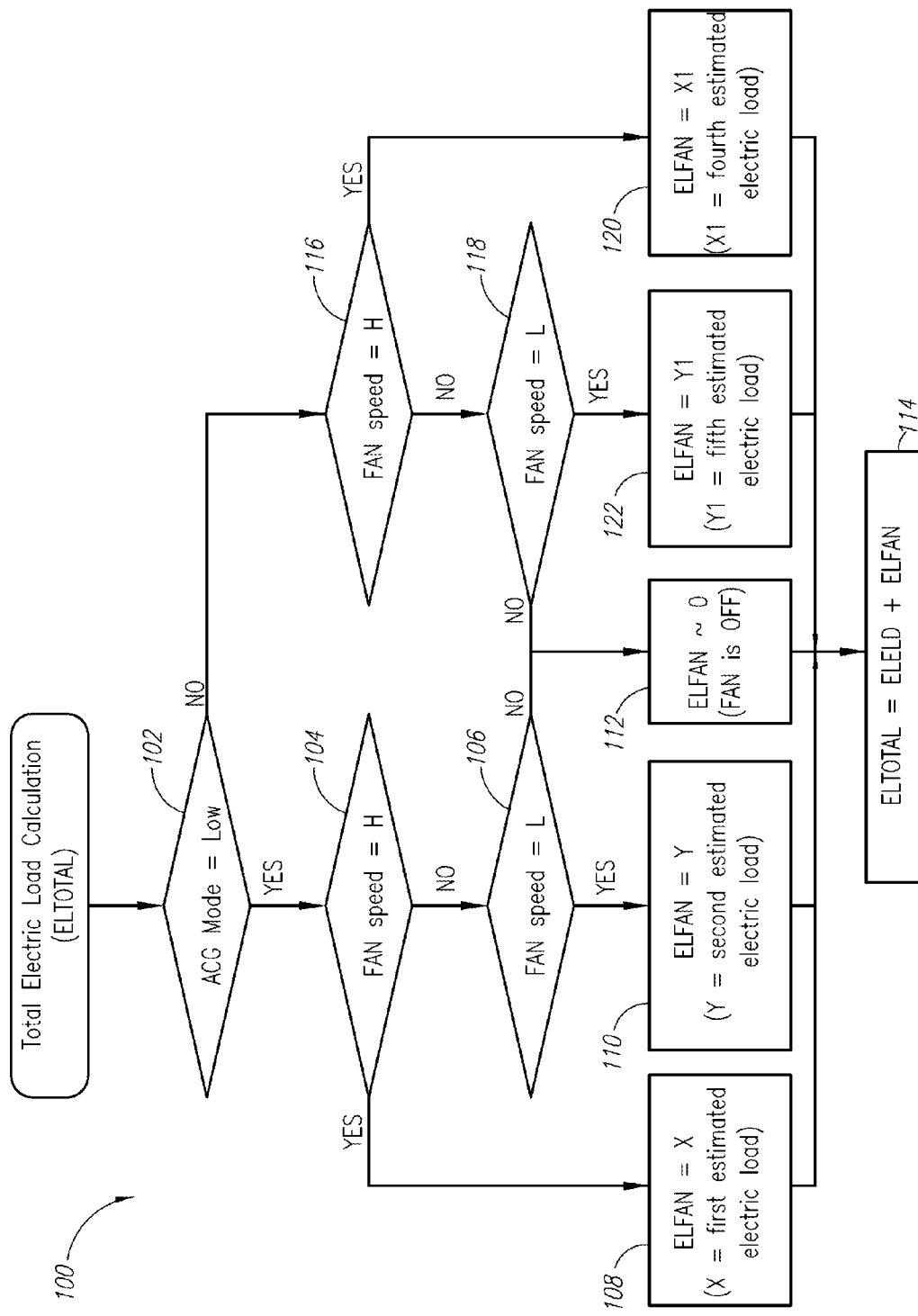
FIG. 4 is a flowchart illustrating the calculation of the total electric load in the electric load system of FIG. 3.

With reference now to FIG. 4, a flowchart 100 illustrates the sequential steps to calculate the total electric load ELTOTAL in the electric load system of FIG. 3. At step 102, a determination is made as to whether the alternating current generator (ACG) is operating in the first or low voltage mode. If the determination at step 102 is yes, then at step 104, a determination is made as to whether the radiator fan (FAN) is operating in a first operating state, which corresponds to a high fan speed H in the low voltage mode. If yes, then the sequence jumps to step 108 where the electric load for the radiator fan ELFAN is estimated to be a first estimated electric load denoted here as X. If step 104 is no, then the sequence proceeds to step 106 where a subsequent determination is made. Specifically, at step 106 a determination is made as to whether the radiator fan (FAN) is operating in a second operating state, which corresponds to a low fan speed L in the low voltage mode. If yes, then the sequence proceeds to step 110 where the electric load for the radiator fan ELFAN is estimated to be a second estimated electric load denoted here as Y, where Y is less than X but greater than zero. If step 106 is no, it is determined that the radiator fan (FAN) is operating in a third operating state, which corresponds to the radiator fan (FAN) being in an OFF position. The sequence then jumps to step 112 where the estimated electric load for the radiator fan (FAN) is estimated to be a third estimated electric load, which corresponds to an electric load of approximately zero.

If the determination at step 102 is no, then the alternating current generator (ACG) is operating in the second or high voltage mode and the sequence proceeds to step 116. At step 116, a determination is made as to whether the radiator fan (FAN) is operating in a fourth operating state, which corresponds to a high fan speed H in the high voltage mode. If yes, then the sequence jumps to step 120 where the electric load for the radiator fan ELFAN is estimated to be a fourth estimated electric load denoted here as X1. If step 116 is no, then the sequence proceeds to step 118 where a subsequent determination is made. Specifically, at step 118 a determination is made as to whether the radiator fan (FAN) is operating in a fifth operating state, which corresponds to a low fan speed L in the high voltage mode. If yes, then the sequence proceeds to step 122 where the electric load for the radiator fan ELFAN is estimated to be a fifth estimated electric load denoted here as Y1, where Y1 is less than X1 but greater than zero. If step 118 is no, it is determined that the radiator fan (FAN) is operating in the third operating state, which corresponds to the radiator fan (FAN) being in an OFF position. The sequence then jumps to step 112 where the estimated electric load for the radiator fan (FAN) is estimated to be the third estimated electric load, which corresponds to an electric load of approximately zero.

Once the estimated electric load for the radiator fan ELFAN is determined at either step 108, 110, 112, 120 or 122, the sequence proceeds to step 114 where the total electric load ELTOTAL is calculated. The total electric load ELTOTAL is determined from the sum of the electric load from the electric devices via the electric load detector ELELD, and the electric load from the radiator fan ELFAN. Thus, ELTOTAL=ELELD+ELFAN.

It should be noted that the electric load system and method for determining an electric load are not limited to the embodiment described above and shown in the figures. For example, an electric load for any electrically driven element, in lieu of the radiator fan, controlled by the electric control unit can be estimated by the electric control unit. Thus, the above embodiment described above and shown in the figures is not limited to a radiator fan and is for illustrative purposes only.

In addition to the electric changes in the inventive electric load system over the known electric load system in FIGS. 1 and 2, software is programmed into the electric control unit (ECU) to thereby implement the procedure described in FIG. 4. The software can be programmed to provide electric load estimates for radiator fans having different electric load requirements. Thus, the inventive electric load system is versatile in that it can be applied to different vehicles having different electric load configurations and requirements.

As mentioned above, the advantage to this electric load arrangement is that the electric load for the radiator fan (or any electrically driven element) is no longer measured by the electric load detector. Rather, the electric load is estimated by the electric control unit, as explained above. Thus, this arrangement permits the addition of more electric devices, which can be measured by the electric load detector without the need to increase the size and cost of the electric load detector and/or allows an electric load detector of a reduced size to be used.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An electric load system for a vehicle that prevents the need for large and expensive electric load detector comprising:

an electrically driven element operating in a plurality of operating states and a plurality of voltage modes thereby generating an electric load;
a plurality of electric devices;
   wherein the plurality of electric devices are separate from the electrically driven element and the plurality of electric devices generates an electric load that is separate from the electric load generated by the electrically driven element;
an electric load detector utilized to measure the electric load generated by a plurality of electric devices that is separate from the electric load generated by the electrically driven element; and
an electric control unit utilized to estimate the electric load of the electrically driven element that is separate from the electric load of the plurality of electric devices;
wherein the electric control unit evaluates a current operating state from a plurality of operating states and a current voltage mode from the plurality of voltage modes to estimate the electric load generated by the electrically driven element, and
   wherein the electric control unit communicates with the electric load detector and adds the electric load measured by the electric load detector and the electric load generated by the electrically driven element as estimated by the electric control unit to determine a total electric load.

2. The electric load system of claim 1,
wherein plurality of operating states includes at least one of: a first operating state, a second operating state, and a third operating state,
wherein the electric control unit assigns a first estimated electric load to the electrically driven element if the electrically driven element is in the first operating state,
wherein the electric control unit assigns a second estimated electric load to the electrically driven element if the electrically driven element is in the second operating state, and
wherein the electric control unit assigns a third estimated electric load to the electrically driven element if the electrically driven element is not in the first operating state or the second operating state.

3. The electric load system of claim 2, wherein the first estimated electric load is greater than the second estimated electric load and the second estimated electric load is greater than the third estimated electric load.

4. The electric load system of claim 3, wherein the electrically driven element is a radiator fan, and wherein the first operating state corresponds to a high fan speed, the second operating state corresponds to a low fan speed, and the third operating state corresponds to an OFF position.

5. The electric load system of claim 4, wherein the third estimated electric load corresponds to an electric load of approximately zero.

6. The electric load system of claim 1, wherein the electrically driven element is a radiator fan configured to operate in the plurality of voltage modes, wherein the electric control unit partially estimates the electric load generated by the radiator fan based on the voltage mode configuration of the radiator fan.

7. The electric load system of claim 6, wherein the plurality of voltage modes includes at least one of: a first voltage mode that corresponds to a low voltage and a second voltage mode that corresponds to a high voltage, wherein the radiator fan is configured to operate in the first voltage mode when the radiator fan operates in a first operating state when a radiator fan speed is high, a second operating state when the radiator fan speed is low, or a third operating state, and the radiator fan is configured to operate in the second voltage mode when the radiator fan operates in a fourth operating state when the radiator fan speed is high, a fifth operating state when the radiator fan speed is low, or the third operating state.

8. The electric load system of claim 7,
wherein the electric control unit assigns a first estimated electric load to the radiator fan if the radiator fan is in the first operating state,
wherein the electric control unit assigns a second estimated electric load to the radiator fan if the radiator fan is in the second operating state,
wherein the electric control unit assigns a third estimated electric load to the radiator fan if the radiator fan is not in the first operating state or the second operating state and the radiator fan is in the first voltage mode,
wherein the electric control unit assigns a fourth estimated electric load to the radiator fan if the radiator fan is in the fourth operating state, and
wherein the electric control unit assigns a fifth estimated electric load to the radiator fan if the radiator fan is in the fifth operating state.

9. The electric load system of claim 8, wherein the first estimated electric load and the fourth estimated electric load are greater than the second estimated electric load and the fifth estimated electric load respectively, and the second estimated electric load and the fifth estimated electric load are each greater than the third estimated electric load.

10. The electric load system of claim 9, wherein the first operating state and the fourth operating state correspond to a high fan speed, the second operating state and the fifth operating state correspond to a low fan speed, and the third operating state corresponds to an OFF position.

11. The electric load system of claim 10, wherein the third estimated electric load corresponds to an electric load of approximately zero.

12. A method of determining an electric load in a vehicle comprising:
   measuring an electric load generated by a plurality of electric devices;
   estimating an electric load generated by an electrically driven element based on a plurality of operating states and a plurality of voltage modes of the electrically driven element ; and
      adding the electric load as measured from the electric load detector and the electric load generated by the electrically driven element to determine a total electric load,
   wherein the electric load generated by the electrically driven element is separately estimated by an electric control unit and the electric load generated by the plurality of electronic devices is separately measured by an electric load detector.

13. The method of claim 12, wherein estimating an electric load generated by the electrically driven element based on the operating state of the electrically driven element includes:
   determining if the electrically driven element is in a first operating state;
   assigning a first estimated electric load to the electrically driven element if the electrically driven element is in the first operating state;
   determining if the electrically driven element is in a second operating state if the electrically driven element is not in the first operating state;
   assigning a second estimated electric load to the electrically driven element if the electrically driven element is in the second operating state; and assigning a third estimated electric load to the electrically driven element if the electrically driven element is not in the first operating state or the second operating state.

14. The method of claim 13, wherein the first estimated electric load is greater than the second estimated electric load and the second estimated electric load is greater than the third estimated electric load.

15. The method of claim 14, wherein the electrically driven element is a radiator fan, and wherein the first operating state corresponds to a high fan speed, the second operating state corresponds to a low fan speed, and the third operating state corresponds to an OFF position.

16. The method of claim 15, wherein the third estimated electric load corresponds to an electric load of approximately zero.

* * * * *